UNITED STATES PATENT OFFICE.

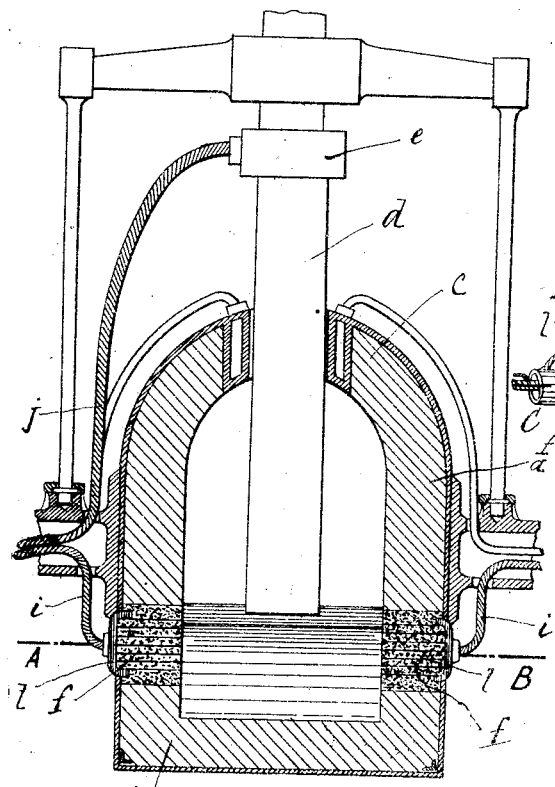
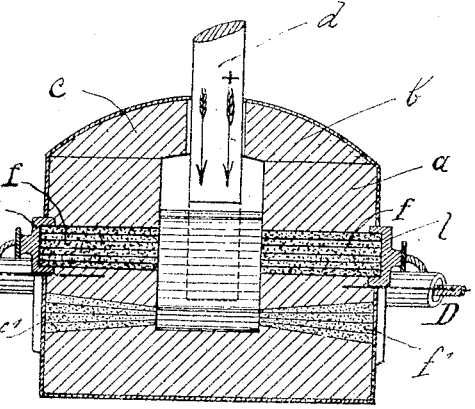
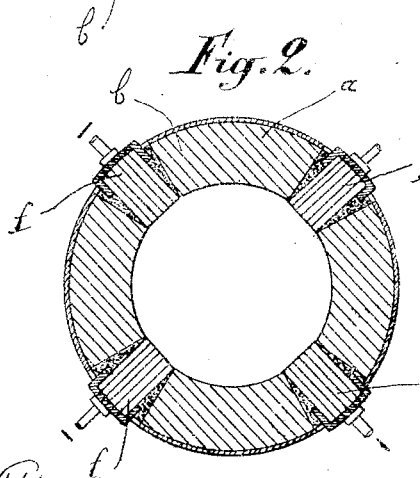
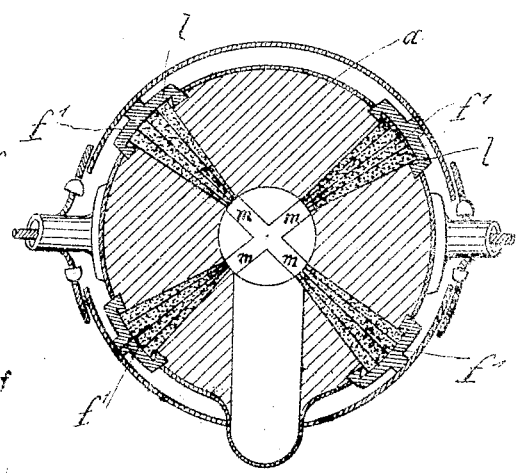

TOUSSAINT LEVOZ, OF HÉER, BELGIUM.

ELECTRIC FURNACE.

1,094,912.  Specification of Letters Patent.  Patented Apr. 28, 1914.

Application filed September 3, 1910. Serial No. 580,286.

*To all whom it may concern:*

Be it known that I, TOUSSAINT LEVOZ, a citizen of the Kingdom of Belgium, residing at Héer, Belgium, have invented some new and useful Improvements in Electric Furnaces; and I do hereby declare the following to be a full, clear, and exact description of the same.

The present invention has for its object a device for manufacturing electro-steel, i. e. steel obtained electrolytically.

In the numerous devices hitherto known for the same object, the purpose aimed at has been to increase as much as possible the working surface of the electrical furnace (arc, induction or resistance furnace) by correspondingly decreasing its height. Said arrangement involves many disadvantages, especially as far as the exaggerated consumption of electrical energy is concerned.

In the present invention, the surface of the electric furnace is reduced as much as possible, its height being increased correspondingly. The negative electrodes are evenly distributed in the side walls of the furnace, at the level of the upper part of the bath, said negative electrodes surrounding one or more positive electrodes suspended centrally in the top part of the furnace and the total diameter of which is about one half of the furnace diameter. By this arrangement the electric current arriving through the positive electrode divides itself at the surface of the bath among the lateral negative electrodes, thus securing the uniform high temperatures necessary for a perfect refining and saving a considerable amount of electrical energy. The furnace may also be constructed with two superposed sets of lateral negative electrodes, in which case it is used, not only for refining, but also for melting purposes, the second set of negative electrodes being at the level of the bottom of the furnace and acting for melting the iron which is afterward refined by the upper set of negative electrodes, the positive electrode being in that case vertically movable.

Other features of the invention will appear in the following specification.

In the accompanying drawings: Figure 1 is a vertical sectional view of a furnace embodying the invention; Fig. 2 is a sectional plan of same, shown along the line A—B Fig. 1 showing four negative electrodes; Fig. 3 is a vertical sectional view of a modification; Fig. 4 is a sectional plan of the furnace shown in Fig. 3 taken along the line C. D. Fig. 5 is a detailed sectional view of the bottom of the tank showing the formation of the channel $m'$.

The furnace shown in Figs. 1 and 2 is composed of a cylindrical tank $a$, preferably made of sheet iron lined with a suitable refractory material $b$. The vault $c$ is provided with an opening for the reception of a positive electrode $d$ made of any suitable material and cooled by means of a cold water jacket $e$. Inside of the refractory brickwork lining are located a plurality of negative electrodes $f$, made of any suitable material (four in the case shown) which are placed at the normal level of the metal bath. The negative electrodes are connected to the source of current by means of conductors $i$ and the positive electrode $d$ by means of a conductor $j$. The electrodes can be made of any suitable material for instance carbon but it has been found preferable to make the negative electrodes out of pure iron which may be arranged in parallel and embedded in a mixture of magnesia and tar, and connected together by a copper bar $l$ to which the conductor $i$ leading to the negative pole of the source of current is attached.

The furnace constructed as above described can only be used for refining, not for melting iron. In order to enable it to work as a melting and refining furnace, the arrangement shown in Figs. 3 and 4 is used. In said figures there are two superposed sets of negative electrodes $f$, $f^1$. The electrodes $f$ are situated at the level of the upper part of the metal bath, as in the above described device and are used for refining purpose. The electrodes $f^1$ are arranged at the level of the bottom of the tank which is provided with hollow channels $m$. Said electrodes are used for melting purposes. The working of said device is as follows: The furnace being thoroughly dried and well heated by means of coke, is afterward emptied. In the channels $m^1$ a cross piece of iron $m$ is placed the ends of which fit exactly the ends of the four melting electrodes $f^1$, so as to secure a perfect contact with said electrodes. After that the furnace is filled up to one third of its capacity, after which the positive electrode is lowered into the position shown in dotted lines in Fig. 3 so that it comes into contact with the material to be melted. As soon as the current passes small arcs are formed which result in melting the material contained in the furnace. As the melting proceeds and the temperature increases new material is added and the positive electrode is raised correspondingly. When the level of the refining electrode is reached, the circuit of the same is closed, so that the current passes in parallel through the two sets of electrodes. When the melted bath covers entirely the refining electrodes, the circuit of the melting negative electrodes is opened, and the current passed only through the upper refining electrodes.

It is well understood that the invention is not limited to the number, size, shape or material of the electrodes above described. Particularly several positive electrodes could be used instead of one, and any number of negative electrodes, or even a continuous circular negative electrode, could be employed instead of the four described and shown, and be always within the scope of the invention.

Claims:

1. A device for manufacturing steel electrolytically, comprising a suitable furnace, a positive electrode, suspended centrally in the top part of said furnace, the lower end of said electrode terminating substantially at the upper surface of the metal bath, a plurality of negative electrodes embedded in the side walls of said furnace, substantially at the level of the lower end of said positive electrode and of the upper surface of the metal bath, said negative electrodes surrounding the positive electrode, and means for conducting the electric current from a suitable source to and from said electrodes, substantially as described.

2. A device for manufacturing steel electrolytically comprising a suitable furnace, one or more positive electrodes, made of any suitable material, suspended centrally in the top part of said furnace and movable vertically, a plurality of negative electrodes, made of any suitable material, embedded in the side walls of said furnace at the upper level of the metal bath and surrounding the positive electrode or electrodes, a second set of negative electrodes, situated under the first set, also embedded in the side wall of the furnace at the level of the furnace bottom and means for conducting the electric current from a suitable source to and from said electrodes, substantially as described.

In testimony whereof, I have signed my name to this specification in the presence of two subscribing witnesses.

TOUSSAINT LEVOZ.

Witnesses:
RENÉ P. WITTEBOLLY,
M. GERBEAULT.